(12) United States Patent
Yamaguchi et al.

(10) Patent No.: US 9,237,508 B2
(45) Date of Patent: Jan. 12, 2016

(54) MOBILE TERMINAL AND INFORMATION READING PREVENTING METHOD

(71) Applicant: NTT DOCOMO, INC., Tokyo (JP)

(72) Inventors: Kumiko Yamaguchi, Tokyo (JP); Tetsuhiro Tanno, Tokyo (JP); Kunio Yoshikawa, Tokyo (JP); Tomohiro Akiyama, Tokyo (JP); Tetsuhiro Sasagawa, Tokyo (JP)

(73) Assignee: NTT DOCOMO, INC., Tokyo (JP)

( * ) Notice: Subject to any disclaimer, the term of this patent is extended or adjusted under 35 U.S.C. 154(b) by 18 days.

(21) Appl. No.: 14/129,842

(22) PCT Filed: Feb. 18, 2013

(86) PCT No.: PCT/JP2013/053843
§ 371 (c)(1),
(2) Date: Dec. 27, 2013

(87) PCT Pub. No.: WO2013/129157
PCT Pub. Date: Sep. 6, 2013

(65) Prior Publication Data
US 2014/0206283 A1  Jul. 24, 2014

(30) Foreign Application Priority Data
Mar. 1, 2012 (JP) ................................. 2012-045062

(51) Int. Cl.
*H04B 7/00* (2006.01)
*H04B 5/00* (2006.01)
(Continued)

(52) U.S. Cl.
CPC .............. *H04W 48/02* (2013.01); *H04W 4/008* (2013.01); *H04W 12/08* (2013.01)

(58) Field of Classification Search
CPC .. H04B 5/0025; H04B 5/0056; H04B 5/0062; H04W 4/008; H04W 48/02; H04W 48/08
USPC ........................ 455/41.1–41.3, 410–411, 558
See application file for complete search history.

(56) References Cited

U.S. PATENT DOCUMENTS 7,257,374 B1 * 8/2007 Creigh ......................... 455/41.2
8,577,294 B2 * 11/2013 Causey et al. ................ 455/41.2
(Continued)

FOREIGN PATENT DOCUMENTS

EP        1 953 682 A1    8/2008
JP        2006 340069     12/2006

OTHER PUBLICATIONS

International Search Report Issued Apr. 16, 2013 in PCT/JP13/053843 Filed Feb. 18, 2013.
(Continued)

*Primary Examiner* — Simon Nguyen
(74) *Attorney, Agent, or Firm* — Oblon, McClelland, Maier & Neustadt, L.L.P.

(57) ABSTRACT

A mobile terminal capable of determining whether a near field communication source is a mobile terminal or not, and capable of appropriately restricting information reading in near field communication. The mobile terminal includes an antenna for near field communication and an RF part. The RF part includes an electromotive force measuring part which measures the electromotive force of a carrier wave received by the antenna, a communication permission/prohibition determining part which, when the measured electromotive force is less than or equal to a predetermined threshold value, determines that the sender of the carrier wave is a mobile terminal and outputs a communication prohibition signal, and an RF controller which acquires the communication prohibition signal and locks the RF part.

10 Claims, 14 Drawing Sheets

(51) Int. Cl.

| | | |
|---|---|---|
| *H04M 1/66* | (2006.01) | |
| *H04M 1/68* | (2006.01) | |
| *H04M 3/16* | (2006.01) | |
| *H04W 48/02* | (2009.01) | |
| *H04W 4/00* | (2009.01) | |
| *H04W 12/08* | (2009.01) | |

(56) References Cited

U.S. PATENT DOCUMENTS

| | | | |
|---|---|---|---|
| 2005/0090267 A1* | 4/2005 | Kotzin | 455/456.4 |
| 2007/0029392 A1* | 2/2007 | Nakatsugawa et al. | 235/492 |
| 2007/0155363 A1* | 7/2007 | Rager et al. | 455/410 |
| 2008/0238632 A1 | 10/2008 | Endo et al. | |
| 2008/0268906 A1* | 10/2008 | Ohmoto | 455/558 |
| 2010/0279606 A1* | 11/2010 | Hillan et al. | 455/41.1 |
| 2011/0215905 A1* | 9/2011 | Shen et al. | 340/10.1 |
| 2013/0005243 A1* | 1/2013 | Royston | 455/41.1 |

OTHER PUBLICATIONS

Second Extended European Search Report issued Sep. 2, 2015 in Patent Application No. 13754653.7.

Extended European Search Report issued Jun. 19, 2015 in Patent Application No. 13754653.7.

* cited by examiner

EXAMPLE OF CARRIER WAVE OUTPUT FROM SMARTPHONE INCLUDING NFC READER/WRITER FUNCTIONALITY

EXAMPLE OF CARRIER WAVE OUTPUT FROM READER/WRITER AT TICKET GATE, ENTRANCE AND EXIT CONTROL SYSTEM, OR STATION KIOSK

FIG. 14A

| P. | STATE OF TERMINAL | FLAG |
|---|---|---|
| 1 | DISPLAY IS LOCKED | 2 |
| 2 | DETECTED POSITION (LATITUDE, LONGITUDE) = (35.69363,139.70399) IN JAPAN (IN PERMITTED AREA) | 1 |
| 3 | CURRENT TIME = 20:15 (WITHIN NFC PERMITTED HOURS) | 1 |
| 4 | WIRELESS LAN AP = ID: XXXXXXXXX (NOT BLACKLISTED) | 1 |
| 5 | WIRELESS LAN AP = ID: XXXXXXXXX (NOT WHITELISTED) | 2 |
| 6 | NONE IS APPLICABLE | 1 |

FIG. 14B

| P. | STATE OF TERMINAL | FLAG |
|---|---|---|
| 1 | DISPLAY IS LOCKED | 2 |
| 2 | DETECTED POSITION (LATITUDE, LONGITUDE) = (35.68138,139.76608) IN JAPAN (IN PERMITTED AREA) | 1 |
| 3 | CURRENT TIME = 17:26 (WITHIN NFC PERMITTED HOURS) | 1 |
| 4 | WIRELESS LAN AP = ID: XXXXXXXXX (BLACKLISTED) | 1 |
|  |  |  |
|  |  |  |

FIG. 14C

| P. | STATE OF TERMINAL | FLAG |
|---|---|---|
| 1 | DISPLAY IS LOCKED | 2 |
| 2 | DETECTED POSITION (LATITUDE, LONGITUDE) = (39.98449,116.43585) OUTSIDE JAPAN (OUTSIDE PERMITTED AREA) | 1 |
|  |  |  |
|  |  |  |
|  |  |  |
|  |  |  |

MOBILE TERMINAL AND INFORMATION READING PREVENTING METHOD

TECHNICAL FIELD

The present invention relates to a mobile terminal capable of preventing information from being read through near field communication and a method for preventing information from being read.

BACKGROUND ART

More and more mobile terminals now come with an NFC (Near Field Communication) reader/writer functionality and are capable of peer-to-peer communication with other terminals. Some mobile terminals incorporating reader/writer functionality are intermittently outputting a carrier wave (packets) to attempt to find a terminal to communicate with through NFC. Many of such mobile terminals have a function that allows a user to reading information from another terminal simply by bringing the mobile terminal close to that correspondent terminal without needing a user operation on the terminal. The NFC reader/writer function can be abused at an office or on a crowded train to read information from the user's mobile terminal when the mobile terminal is put aside.

Of course, information that a mobile terminal incorporating reader/writer functionality can read is information that does not require authentication. Many mobile terminal users, however, regard such readable information as being private information that the users do not want to reveal to others. In the case of fare cards for transportation services (such as suica (registered trademark)), for example, information such as (1) history information about stations used and time and date of use, (2) history information about ticket gates passed through, and (3) the prepaid balance information on the card can be read without needing authentication. Allowing these kinds of information which can be read without needing authentication to be read without restriction through a mobile terminal incorporating reader/writer functionality poses many problems in terms of personal information protection.

A mobile terminal incorporating near-field IC card functionality disclosed in Patent literature 1 is intended to prevent external unauthorized access to the mobile terminal by a person other than the owner of the mobile terminal when the mobile terminal is not in use. When the mobile terminal with near-field IC card functionality in Patent literature 1 detects a radio access signal to the near-field IC card part, the mobile terminal accepts the external access if a tilt sensed by a tilt sensor is within a predetermined tilt range; otherwise disables the near-field IC card part functionality. The near-field IC card part is used normally while being held horizontal to or near horizontal to the ground. Control means of the mobile terminal with near-field IC card functionality in Patent literature 1 therefore does not immediately enable the near-field IC card part when the control means detects a radio access signal to the near-field IC card part, but makes a determination as to the tilt of the terminal detected by tilt sensing means. If the detected tilt of the terminal is not within a predetermined range, for example if the terminal is placed in a pocket of the user's clothing vertically or near vertically, the control means determines that the attitude of the terminal does not indicate an expected situation in which the terminal is used by the user and disables the near-field IC card part. This can prevent external unauthorized access to the near-field IC card part.

PRIOR ART LITERATURE

Patent Literature

Patent literature 1: Japanese Patent Application Laid-Open No. 2006-340069

SUMMARY OF THE INVENTION

Problems to be Solved by the Invention

However, according to the existing technique, when a tilt detected by the tilt sensor is near horizontal, it is determined that the user is holding the card (mobile terminal) over another terminal, that is, that the user intends to perform near field communication, and the mobile terminal accepts external access. Therefore, unauthorized access to the mobile terminal can be made while the mobile terminal is left horizontally on a surface such as the top of a desk and leakage of personal information cannot be prevented.

On the other hand, unauthorized reading of personal information may be substantially prevented by permitting near field communication only with reader/writers placed at places such as stations as before and restricting only reading access from a mobile terminal, which can be unauthorized access. However, it is impossible to determine through near field communication whether a reader/writer is a stationary one placed at a station or store or a mobile terminal. This is because near field communication standards do not require reader/writers to provide their identification information. Since it is impossible in these circumstances to readily and quickly determine whether a communication source is a mobile terminal or a reader/writer that is not a mobile terminal, it is difficult to prevent unauthorized reading of information that does not require authentication in near field communication. Therefore an object of the present invention is to provide a mobile terminal capable of determining whether a near field communication source is a mobile terminal or not, and capable of appropriately restricting information reading in near field communication.

Means to Solve the Problems

A mobile terminal of the present invention includes an antenna for near field communication and an RF part. The RF part includes an electromotive force measuring part, a communication permission/prohibition determining part, and an RF controller.

The electromotive force measuring part measures the electromotive force of a carrier wave received by the antenna. When the measured electromotive force is less than or equal to a threshold value, the communication permission/prohibition determining part determines that the sender of the carrier wave is a mobile terminal and outputs a communication prohibition signal. The RF controller acquires the communication prohibition signal and locks the RF part.

Effects of the Invention

A mobile terminal according to the present invention is capable of determining whether a near field communication source is a mobile terminal or not and is capable of appropriately restricting information reading in near field communication.

BRIEF DESCRIPTION OF THE DRAWINGS

FIG. 14 illustrates exemplary flags corresponding to states of the terminal of the fifth embodiment acquired by a terminal status management part of the mobile terminal, where FIG. 14A illustrates a situation in which the mobile terminal is locked, in an NFC permitted area, within NFC permitted hours, and a nearby wireless LAN access point is not blacklisted nor whitelisted, FIG. 14B illustrates a situation in which the mobile terminal is locked, in an NFC permitted area, within NFC permitted hours, and a nearby wireless LAN access point is blacklisted, and FIG. 14C is a situation in which the mobile terminal is locked and is outside an NFC permitted area.

DETAILED DESCRIPTION OF THE EMBODIMENTS

Figure 1:
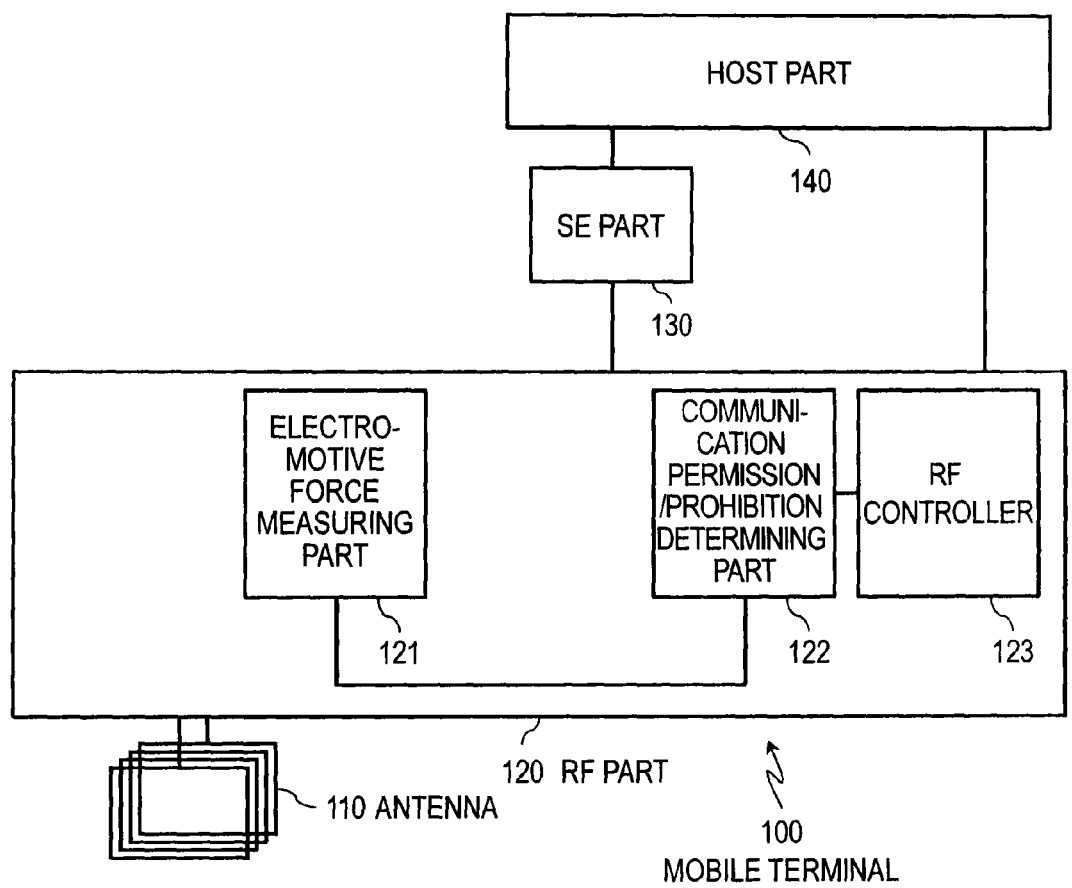
FIG. 1 is a block diagram illustrating a configuration of a mobile terminal of a first embodiment.

Embodiments of the present invention will be described below in detail. Like components are given like reference numerals and repeated description of those components will be omitted.

First Embodiment

Figure 2:
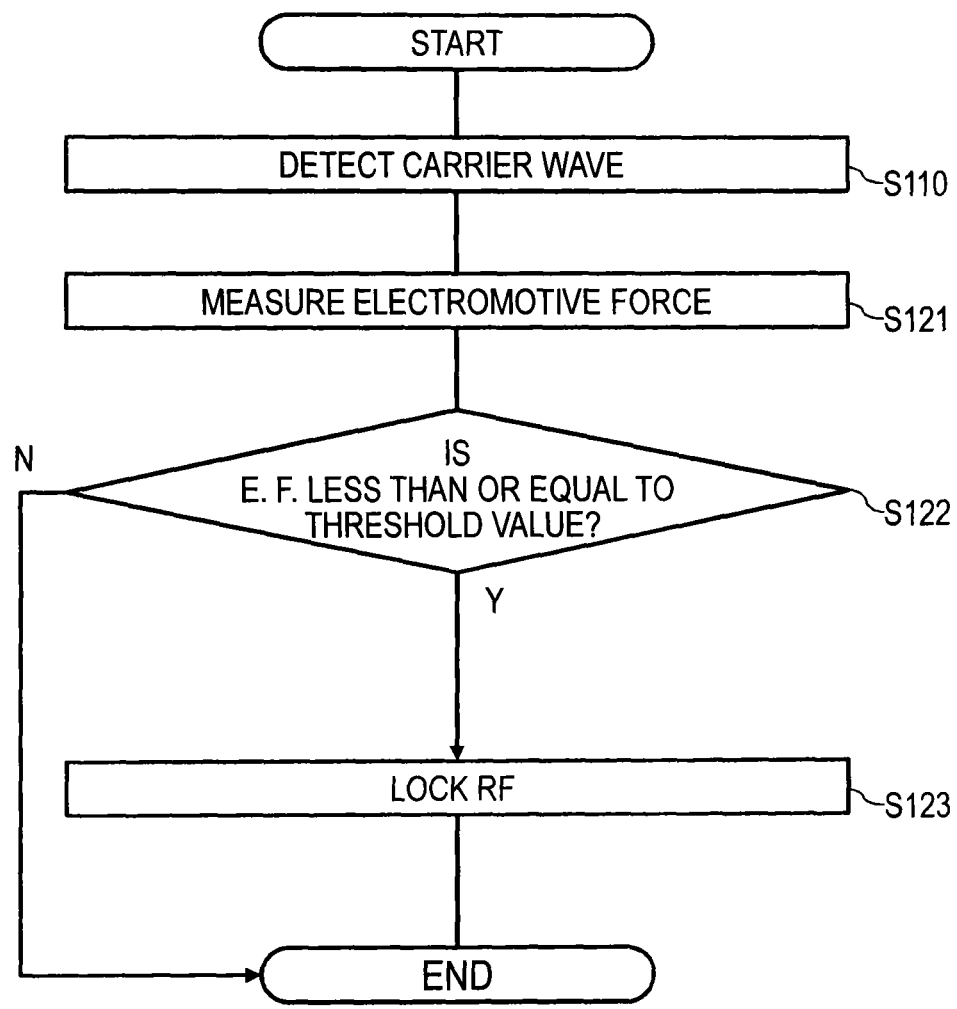
FIG. 2 is a flowchart illustrating an operation of the mobile terminal of the first embodiment.

A mobile terminal of a first embodiment, which is one of basic exemplary configurations of the present invention, will be described below in detail with reference to FIGS. 1 and 2. FIG. 1 is a block diagram illustrating a configuration of a mobile terminal 100 of the first embodiment. FIG. 2 is a flowchart illustrating an operation of the mobile terminal 100 of the first embodiment. The mobile terminal 100 of the first embodiment includes an antenna 110 for near-field-communication, an RF part 120, an SE part 130 and a host part 140. The RF part 120 includes an electromotive force measuring part 121, a communication permission/prohibition determining part 122, and an RF controller 123. The RF part 120 is a component that sends and receives a near-field-communication carrier wave. RF is an abbreviation for Radio Frequency. While, in general, RF refers to a radio-frequency electrical signal that can be used in radio communication, RF as used herein refers to a near field communication carrier wave. SE of the SE part 130 is an abbreviation for Secure Element. The SE part 130 includes an area for storing secret information required for electronic payment using the mobile terminal, a memory holding encryption key information, a processor which executes encryption processing, among other components. The host part 140 includes a processor of the mobile terminal and an application execution part which executes various applications, among other components.

The description will be continued with reference to the flowchart of FIG. 2. First, the antenna 110 of the mobile terminal 100 detects a carrier wave from a reader/writer (S110). The electromotive force measuring part 121 included in the RF part 120 measures the electromotive force of the carrier wave received by the antenna 110 (S121). If the measured electromotive force is less than or equal to a predetermined threshold value, the communication permission/prohibition determining part 122 determines that the sender of the carrier wave is a mobile terminal and outputs a communication prohibition signal (S122Y). The RF controller 123 acquires the communication prohibition signal and locks the RF part 120 (S123). Note that when the carrier wave is no longer detected, the RF controller 123 unlocks the RF part 120.

On the other hand, if the measured electromotive force exceeds the predetermined threshold value (S122N), the communication permission/prohibition determining part 122 determines that the sender of the carrier wave is not a mobile terminal and further operation is not performed (END).

The mobile terminal 100 of the first embodiment determines whether or not a communication source reader/writer is a mobile terminal on the basis of the magnitude of an induced electromotive force at an antenna on the passive side. Specifically, since the field intensity (V/m) of a radio wave emitted from the antenna of a reader/writer used at a place such as a ticket gate at a station or a shop is not equal to the field intensity (V/m) of a radio wave emitted from the antenna of a mobile terminal incorporating reader/writer functionality (the field intensity of the radio wave emitted from the antenna of the mobile terminal is smaller), the electromotive force generated at passive circuitry of the mobile terminal that receives near field communication varies in proportion to the field intensity. By taking advantage of the difference in electromotive force generated, the mobile terminal 100 of the first embodiment is capable of whether or not a near field communication source is a mobile terminal incorporating reader/writer functionality.

As has been described above, in the mobile terminal 100 of this embodiment, the electromotive force measuring part 121 measures the electromotive force of a carrier wave received by the antenna 110, the communication permission/prohibition determining part 122 determines, on the basis of the measured electromotive force, whether or not the near field communication source is a mobile terminal and, if the communication permission/prohibition determining part 122 determines that the near field communication source is a mobile terminal, the RF controller 123 locks the RF part 120. The mobile terminal 100 is therefore capable of restricting reading of information in near field communication.

Second Embodiment

Figure 3:
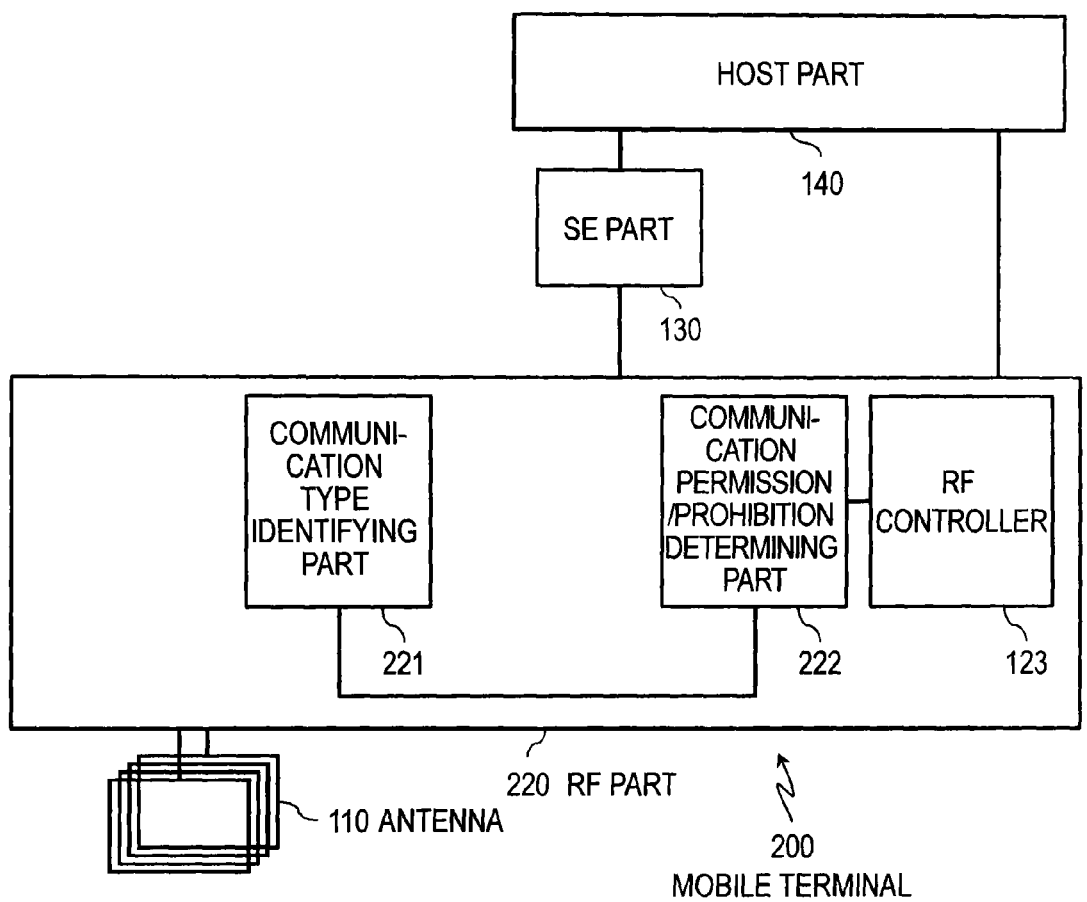
FIG. 3 is a block diagram illustrating a configuration of a mobile terminal of a second embodiment.
Figure 4:
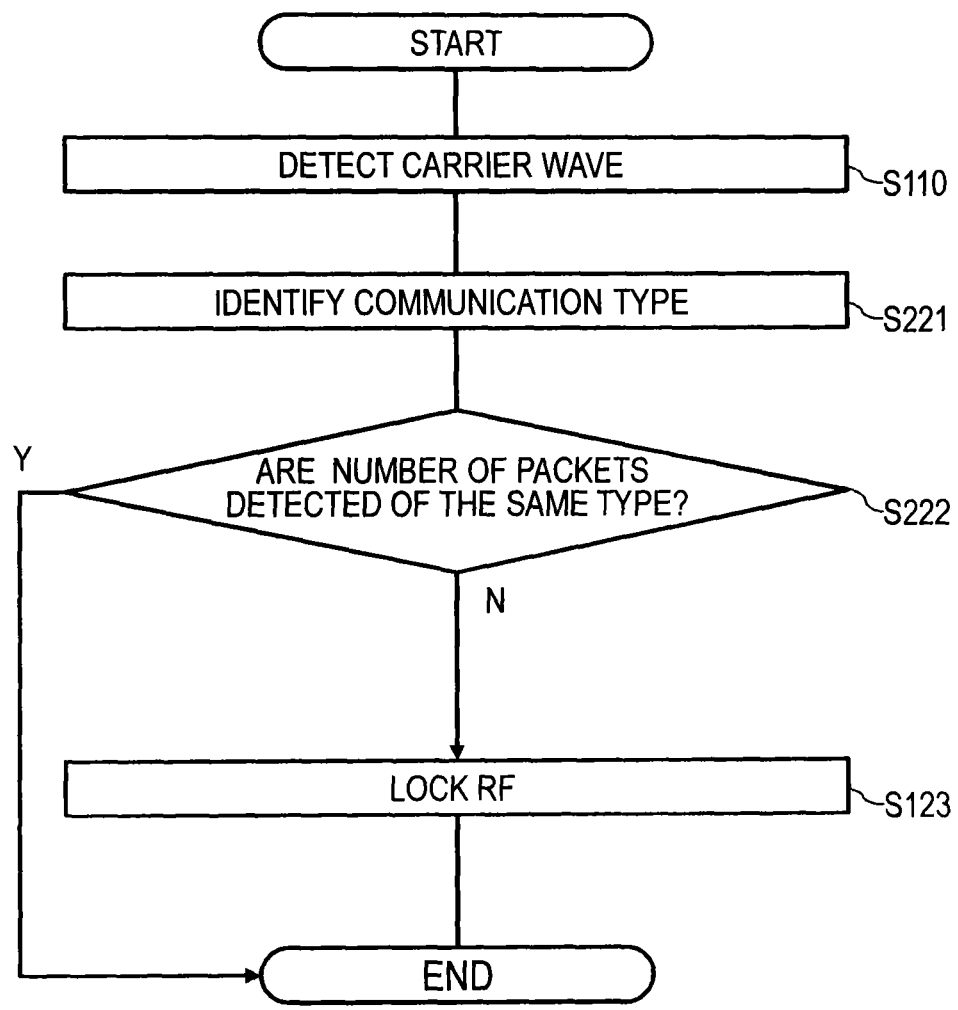
FIG. 4 is a flowchart illustrating an operation of a mobile terminal of the second embodiment.
Figure 5:
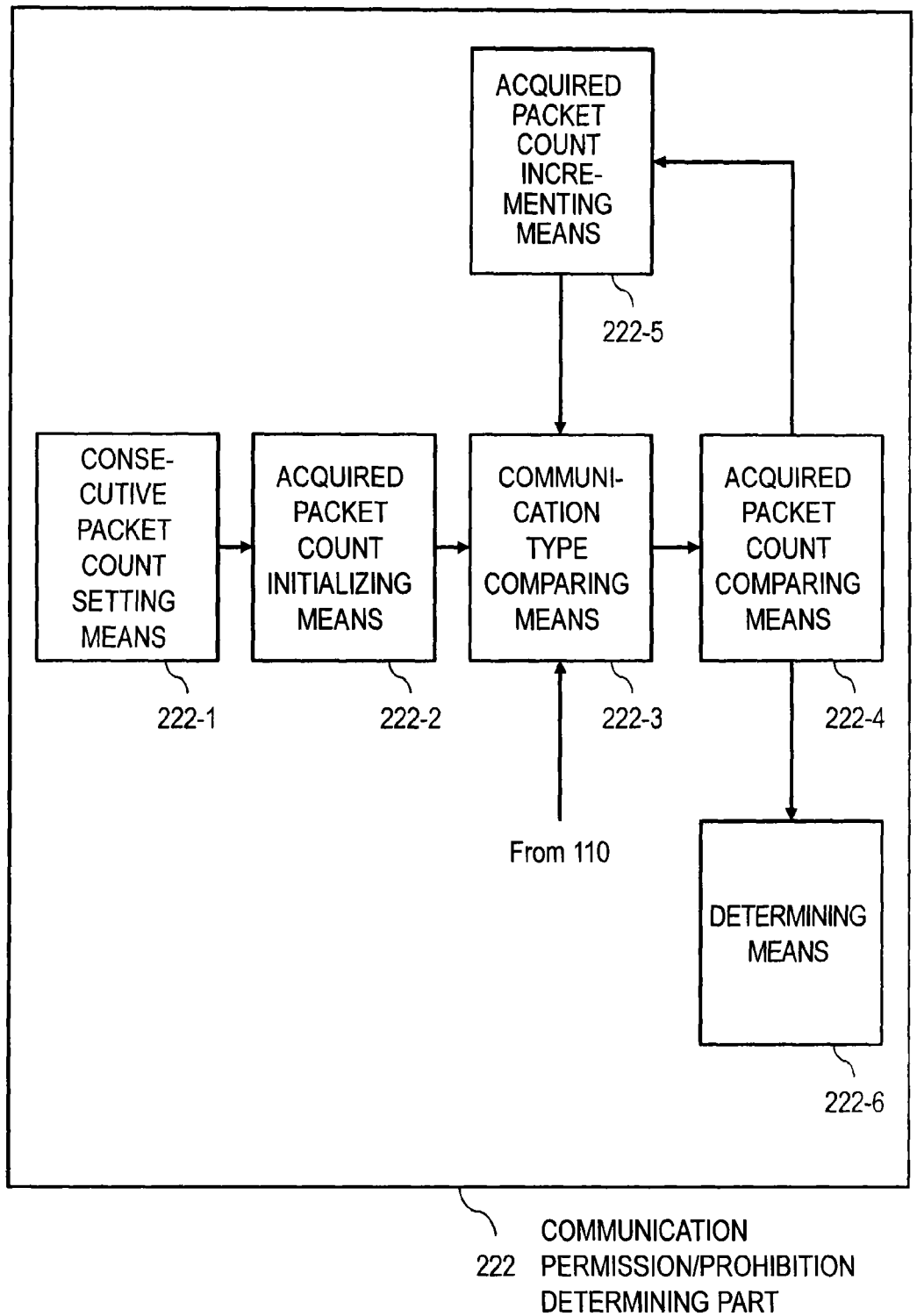
FIG. 5 is a block diagram illustrating a configuration of a communication permission/prohibition determining part of a mobile terminal of the second embodiment.
Figure 6:
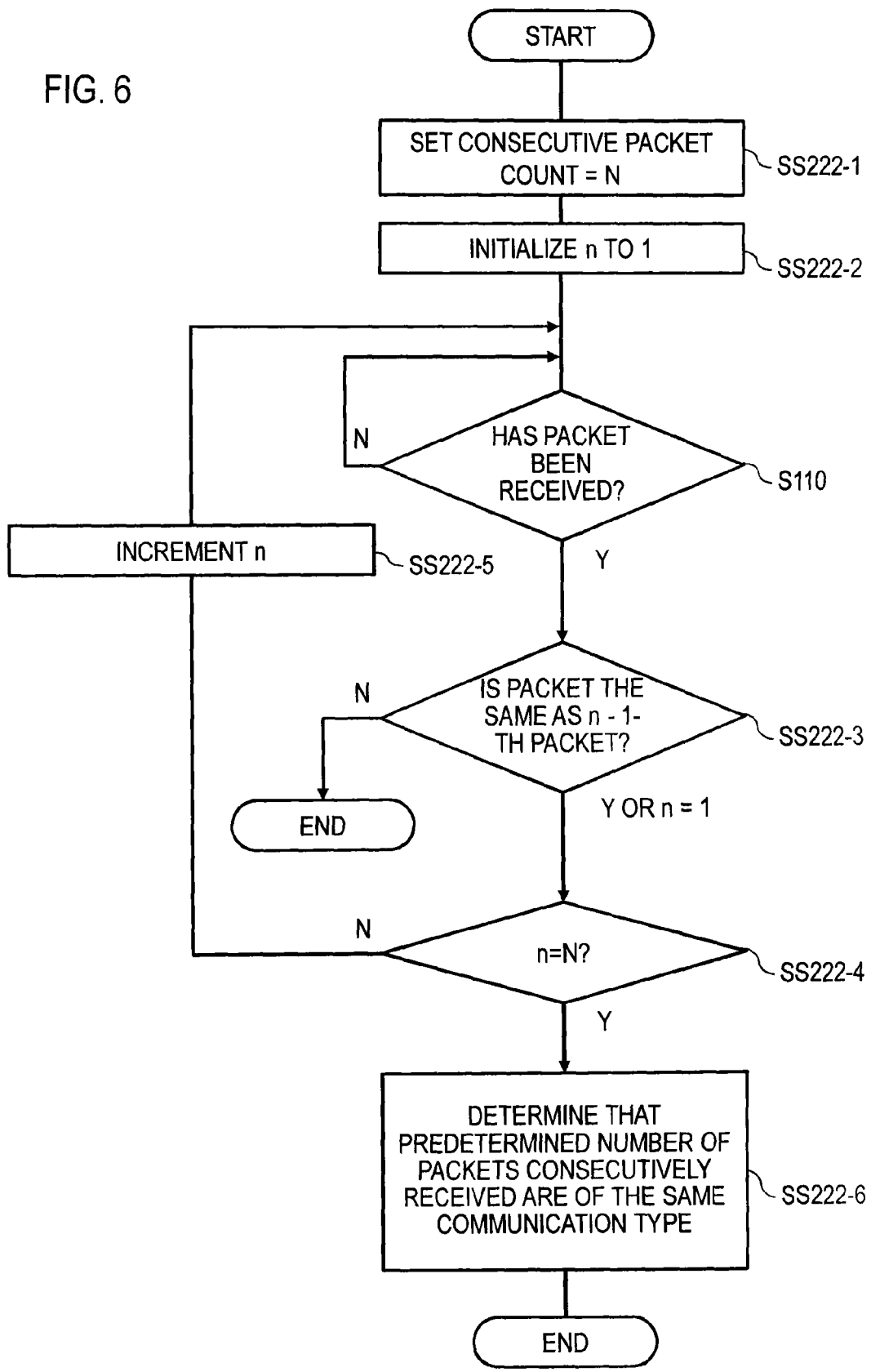
FIG. 6 is a flowchart illustrating an operation of the communication permission/prohibition determining part of a mobile terminal of the second embodiment.
Figure 7:
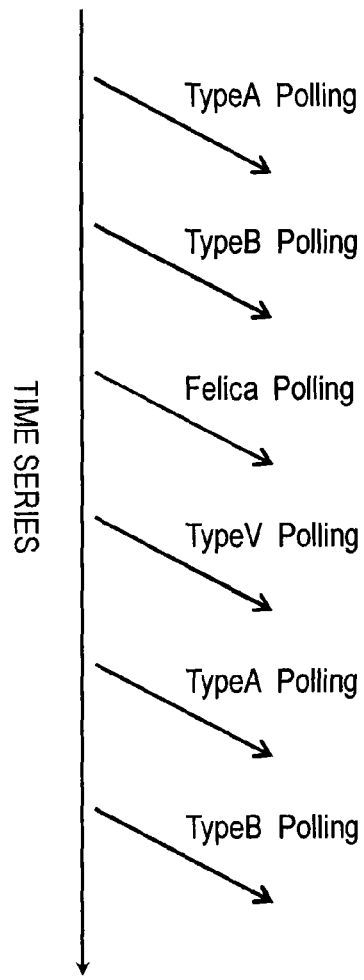
FIG. 7 is a diagram illustrating a difference between a carrier wave output from a mobile terminal incorporating reader/writer functionality and a carrier wave output from a typical reader/writer.
Figure 7:
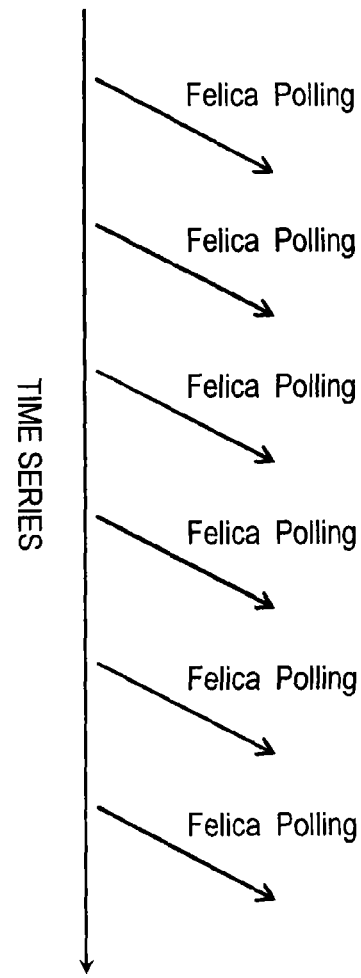

A mobile terminal of a second embodiment, which is one of the exemplary basic configurations of the present invention, will be described below in detail with reference to FIGS. 3, 4, 5, 6 and 7. FIG. 3 is a block diagram illustrating a configuration of a mobile terminal 200 of the second embodiment. FIG. 4 is a flowchart illustrating an operation of the mobile terminal 200 of the second embodiment. FIG. 5 is a block diagram illustrating a configuration of a communication permission/prohibition determining part 222 of the mobile terminal 200 of the second embodiment. FIG. 6 is a flowchart illustrating an operation of the communication permission/prohibition determining part 222 of the mobile terminal 200. FIG. 7 is a diagram illustrating a difference of a carrier wave output from a mobile terminal incorporating reader/writer functionality and a carrier wave output from a typical reader/writer. The mobile terminal 200 of the second embodiment includes an antenna 110 for near field communication, an RF part 220, an SE part 130, and a host part 140. The RF part 220 includes a communication type identifying part 221, a communication permission/prohibition determining part 222, and RF controller 123. The communication permission/prohibition determining part 222 includes consecutive packet count setting means 222-1, acquired packet count initializing means 222-2, communication type comparing means 222-3, acquired packet count comparing means 222-4, acquired packet count incrementing means 222-5, and determining means 222-6.

The description will be continued with reference to the flowchart of FIG. 4. First, the antenna 110 of the mobile terminal 200 detects a carrier wave from a reader/writer (S110). The communication type identifying part 221 identifies, on a received packet-by-packet basis, a communication type of a carrier wave received by the antenna 110 (S221). If the results of communication type identification are not the same for consecutively received packets, the communication permission/prohibition determining part 222 determines that the sender of the carrier wave is a mobile terminal and outputs a communication prohibition signal (S222N). The RF controller 123 acquires the communication prohibition signal and locks the RF part 220 (S123). Note that when the carrier wave is no longer detected, the RF controller 123 unlocks the RF part 220.

On the other hand, if at step S222 the results of communication type identification are the same for the predetermined number of packets consecutively received (S222Y), the communication permission/prohibition determining part 222 determines that the sender of the carrier wave is not a mobile terminal and further operation is not performed (END).

Step S222 can be accomplished by performing the following sub-steps in sequence. First, the consecutive packet count setting means 222-1 sets a consecutive packet count (SS222-1). In this example, the set consecutive packet count=(N≥2). Then, the acquired packet count initializing means 222-2 initializes the acquired packet count n to 1 (SS222-2). When the antenna 110 receives a packet (S110), the process proceeds to sub-step SS222-3. The communication type comparing means 222-3 determines whether or not the packet just received is the same as a packet (an n−1-th packet) immediately before the packet. If the received packet is the same as the packet received immediately before the packet, or if n=1 and there is not a packet received before the packet (SS222-3Y), the process proceeds to sub-step SS222-4. Note that if the received packet is not the same as the packet received before the packet (SS222-3N, END), it is determined that the communication source is a mobile terminal and the process passes through step S222N of FIG. 4, then the RF controller 123 acquires a communication prohibition signal and locks the RF part 220 (S123). On the other hand, if the determination at sub-step SS222-3Y is affirmative, the acquired packet count comparing means 222-4 determines whether or not the number n or acquired packets has reached the set consecutive packet count N. If the number of acquired packets has reached the set consecutive packet count N (SS222-4Y), the determining means 222-6 determines that a predetermined number of packets consecutively received are of the same communication type (SS222-6) and the process passes through step S222Y of FIG. 4, then ends (END). On the other hand, if the number n of acquired packets has not reached the set consecutive packet count N at sub-step SS222-4, (SS222-4N), the acquired packet count incrementing means 222-5 increments n (SS222-5). While in the description of FIG. 6 the reader/writer outputs a plurality of packets at one output of a carrier wave, the reader/writer is not limited to this and may be of a type that outputs one packet at one output of a carrier wave. In this case, the N packets are sent and received in different carrier waves, determination is repeated a predetermined times as to whether the currently received packet and the previously received packet are of the same communication type and, if it is determined that a predetermined number of packets of the same communication type have been received, the process passes through step S222Y of FIG. 4, then ends (END) as described above. If the received packet and the previously received packet are not of the same communication type, it is determined that the communication source is a mobile terminal, the process passes through step S222N of FIG. 4, then the RF controller 123 acquires a communication prohibition signal and locks the RF part 220 (S123).

By taking advantage of a time-series change of the communication type of a carrier wave (packets) that occurs at the antenna on the active side, the mobile terminal 200 of this embodiment determines whether or not a reader/writer that is a communication source is a mobile terminal. That is, most mobile terminals incorporating reader/writer functionality output packets of different communication types in turn as illustrated in FIG. 7 so that the mobile terminals can flexibly respond different communication types used on the passive side. On the other hand, a reader/writer used at a ticket gate or in an entrance and exit control system typically outputs through its antenna a carrier wave of a fixed single communication type, rather than shifting from one communication type to another. In the example in FIG. 7, the smartphone incorporating NFC reader/writer functionality performs control to output a carrier wave of communication types that vary from packet to packet, namely TypeA polling, TypeB polling, Fellica polling, and TypeV polling, in this order. A reader/writer placed at a ticket gate, in an entrance and exit control system or a station kiosk, on the other hand, typically does not output a carrier wave of communication technologies that vary from packet to packet but generates a poling of the same communication type consistently. By taking advantage of the varying communication types, the mobile terminal 200 of this embodiment can determine whether or not a near field communication source is a mobile terminal incorporating reader/writer functionality.

The mobile terminal 200 of the second embodiment is capable of appropriately restricting information reading in near field communication because the communication type identifying part 221 identifies, on a received packet-by-packet basis, the communication type of a carrier wave received by the antenna 110, the communication permission/prohibition determining part 222 determines on the basis of the packet-by-packet identification of the communication type whether or not the near field communication source is a mobile terminal and, if the communication permission/prohibition determining part 222 determines that the near field communication source is a mobile terminal, the RF controller 123 locks the RF part 220.

Third Embodiment

Figure 8:
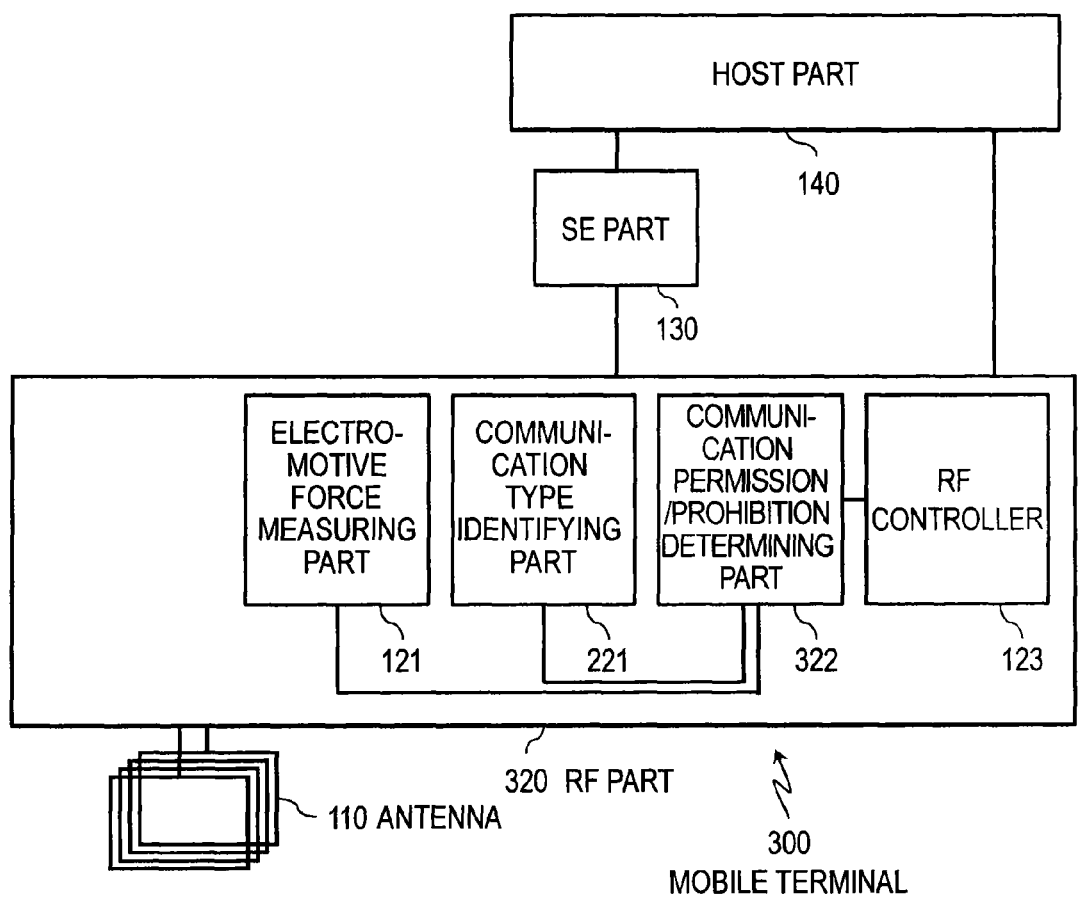
FIG. 8 is a block diagram illustrating a configuration of a mobile terminal of a third embodiment.
Figure 9:
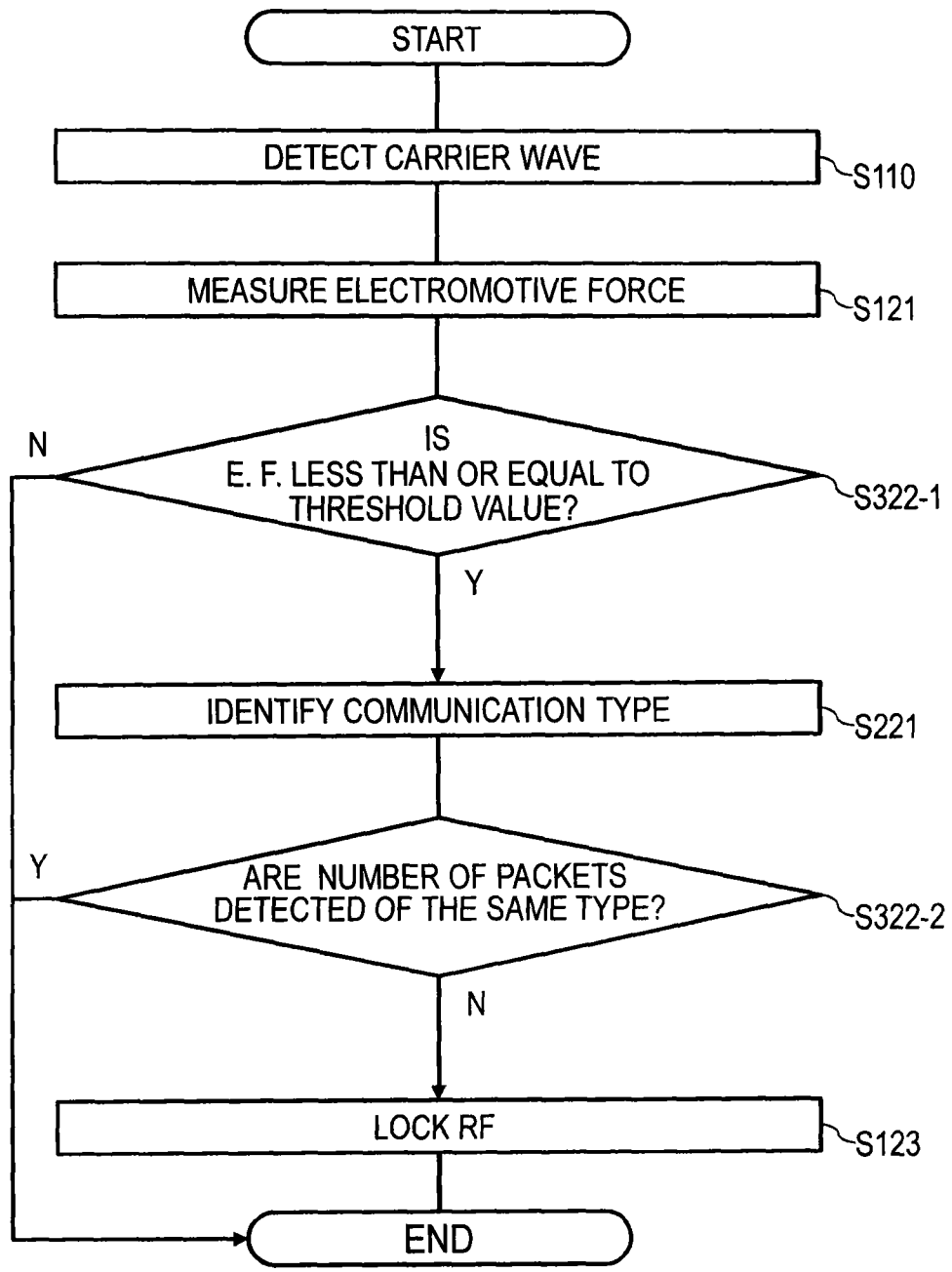
FIG. 9 is a flowchart illustrating an operation of the mobile terminal of the third embodiment.

A mobile terminal of a third embodiment will be described next in detail with reference to FIGS. 8 and 9, which is a combination of the mobile terminal 100 of the first embodiment and the mobile terminal 200 of the second embodiment. FIG. 8 is a block diagram illustrating a configuration of a mobile terminal 300 of the third embodiment. FIG. 9 is a flowchart illustrating an operation of the mobile terminal 300 of the third embodiment. The mobile terminal 300 of the third embodiment includes an antenna 110 for near field communication, an RF part 320, an SE part 130, and a host part 140. The RF part 320 includes an electromotive force measuring part 121, a communication type identifying part 221, a communication permission/prohibition determining part 322, and an RF controller 123.

The description will be continued with reference to the flowchart of FIG. 9. First, the antenna 110 of the mobile terminal 300 detects a carrier wave from a reader/writer (S110). The electromotive force measuring part 121 measures the electromotive force of the carrier wave received by the antenna 110 (S121). If the measured electromotive force is less than or equal to a predetermined threshold value (S322-1Y) and the results of communication type identification are not the same for consecutive received packets, the communication permission/prohibition determining part 322 determines that the sender of the carrier wave is a mobile terminal and outputs a communication prohibition signal (S322-2N). The RF controller 123 acquires the communication prohibition signal and locks the RF part 320 (S123). Note that when the carrier wave is no longer detected, the RF controller 123 unlocks the RF part 320.

On the other hand, if the electromotive force measured at step S322-1 exceeds the predetermined threshold value (S322-1N), the communication permission/prohibition determining part 322 determines that the sender of the carrier wave is not a mobile terminal and further operation is not performed (END). In addition, if at step S322-2 the results of communication type identification are the same for the predetermined number of packets consecutively received (S322-2Y), the communication permission/prohibition determining part 322 determines that the sender of the carrier wave is not a mobile terminal and further operation is not performed (END).

In addition to having the effects of the first and second embodiments, the mobile terminal 300 of the third embodiment is capable of appropriately restricting information reading in near field communication by identifying a communication source with a higher level of accuracy because the mobile terminal 300 determines that the communication source is a mobile terminal only if both of the magnitude of the electromotive force of a carrier wave and the communication type of the carrier wave meet conditions.

Fourth Embodiment

Figure 10:
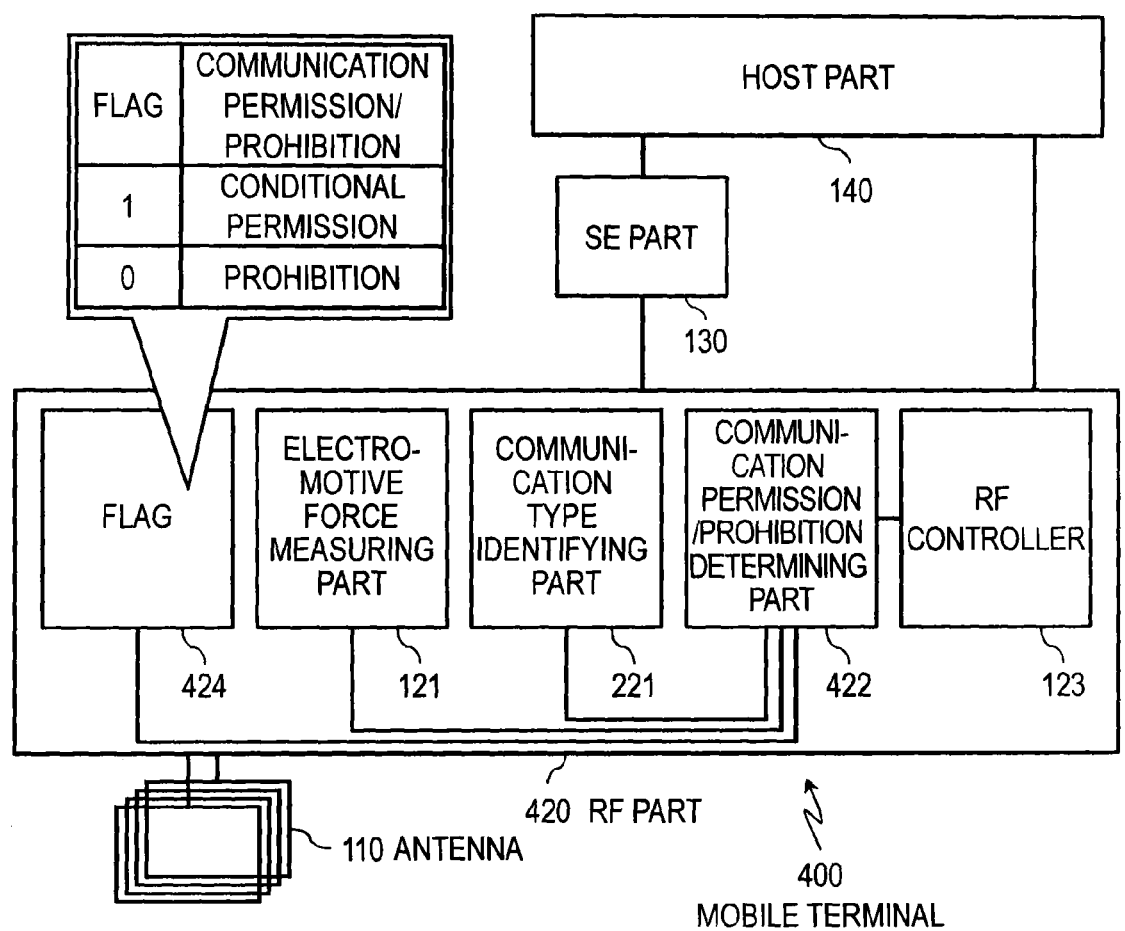
FIG. 10 is a block diagram illustrating a configuration of a mobile terminal of a fourth embodiment.
Figure 11:
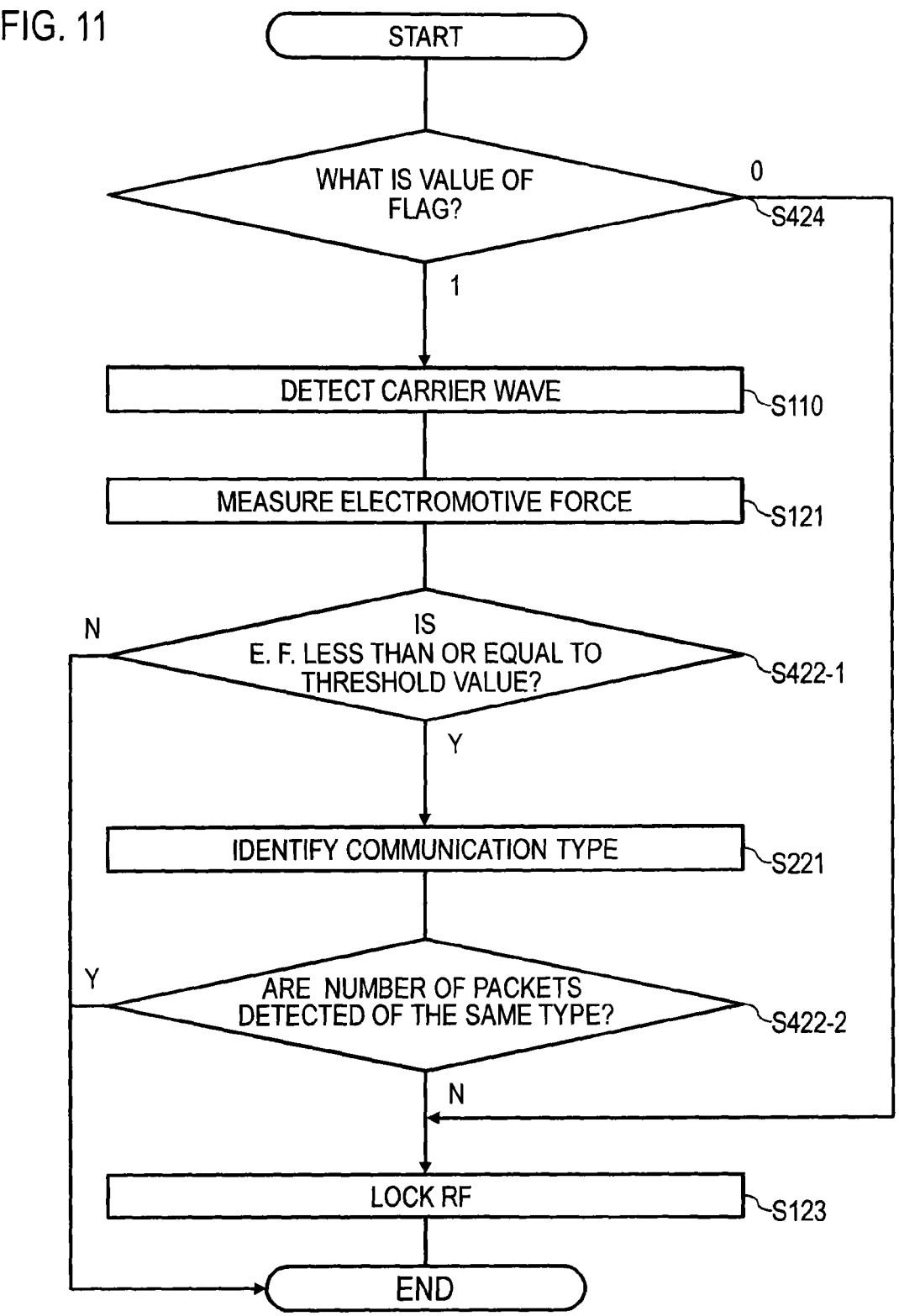
FIG. 11 is a flowchart illustrating an operation of the mobile terminal of the fourth embodiment.

Referring to FIGS. 10 and 11, a mobile terminal of a fourth embodiment will be described, which has the same configuration as the mobile terminal 300 of the third embodiment except that the function of setting a flag relating to communication prohibition is added. FIG. 10 is a block diagram illustrating a configuration of a mobile terminal 400 of the fourth embodiment. FIG. 11 is a flowchart illustrating an operation of the mobile terminal 400 of the fourth embodiment. The mobile terminal 400 of the fourth embodiment includes an antenna 110 for near field communication, and RF part 420, an SE part 130, and a host part 140. The RF part 420 includes an electromotive force measuring part 121, a communication type identifying part 221, a communication permission/prohibition determining part 422, an RF controller 123 and a flag 424. The components of the mobile terminal 400 other than the communication permission/prohibition determining part 422 and the flag 424 have the same functions of the components of the mobile terminal 300 of the third embodiment that are labeled with the same reference numerals and therefore description of those components will be omitted.

The mobile terminal 400 of this embodiment allows a user to set the value of the flag 424 to 0 or 1 through an input into a user operation part, not depicted, of the mobile terminal 400. When the user makes a setting to permit near field communication through an input into the user operation part, a value of 1 (indicating conditional permission) is stored in the flag 424. On the other hand, when the user makes a setting to prohibit near field communication through an input into the user operation part, a value of 0 (indicating prohibition) is stored in the flag 424. Accordingly, in the mobile terminal 400 of the fourth embodiment, first the flag 424 is examined to determine whether the value stored in the flag 424 is 0 or 1. If the value stored in the flag 424 is 0 (prohibition) (S424-0), the communication permission/prohibition determining part 422 outputs a communication prohibition signal and the RF controller 123 acquires the communication prohibition signal and locks the RF part (S123) without determination as to whether the sender of the carrier wave is a mobile terminal or not. Note that when the carrier wave is no longer detected, the RF controller 123 unlocks the RF part 420.

On the other hand, when the value stored in the flag 424 is 1 (conditional permission) (S424-1), step S110 and the subsequent steps are performed. Here, steps S422-1 and S422-2 are the same as steps S322-1 and S322-2, respectively.

As has been described above, the mobile terminal 400 of the fourth embodiment includes the flag 424 that can be changed by a user setting to specify whether to permit or prohibit near field communication and, if the flag 424 is set to a value 0 (prohibition), the RF controller 123 locks the RF part 420 regardless of whether the communication source is a mobile terminal or not. Therefore, in addition to having the effects of the third embodiment, the mobile terminal 400 is capable of improving security against information reading in near field communication.

Fifth Embodiment

Figure 12:
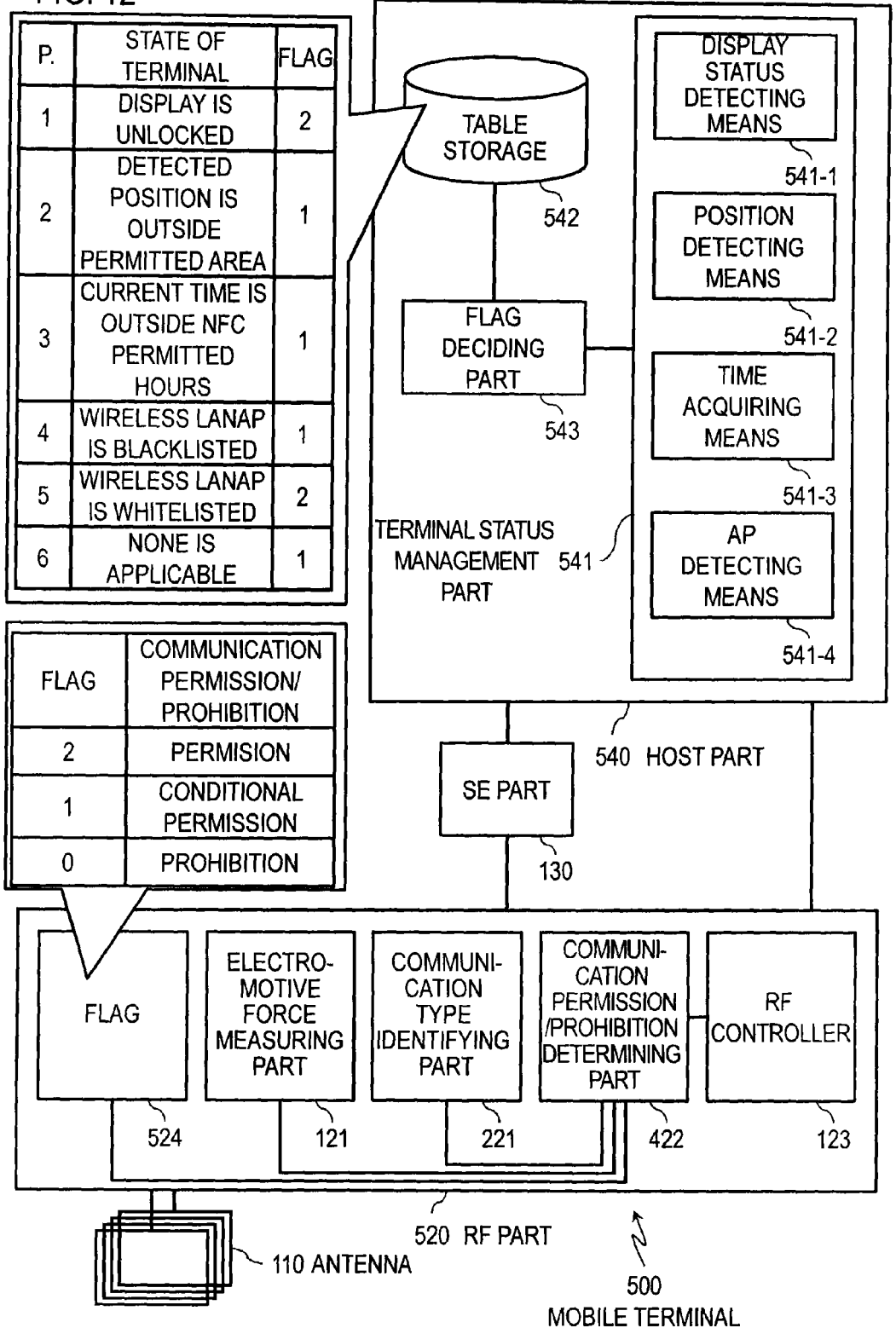
FIG. 12 is a block diagram illustrating a configuration of a mobile terminal of a fifth embodiment.
Figure 13:
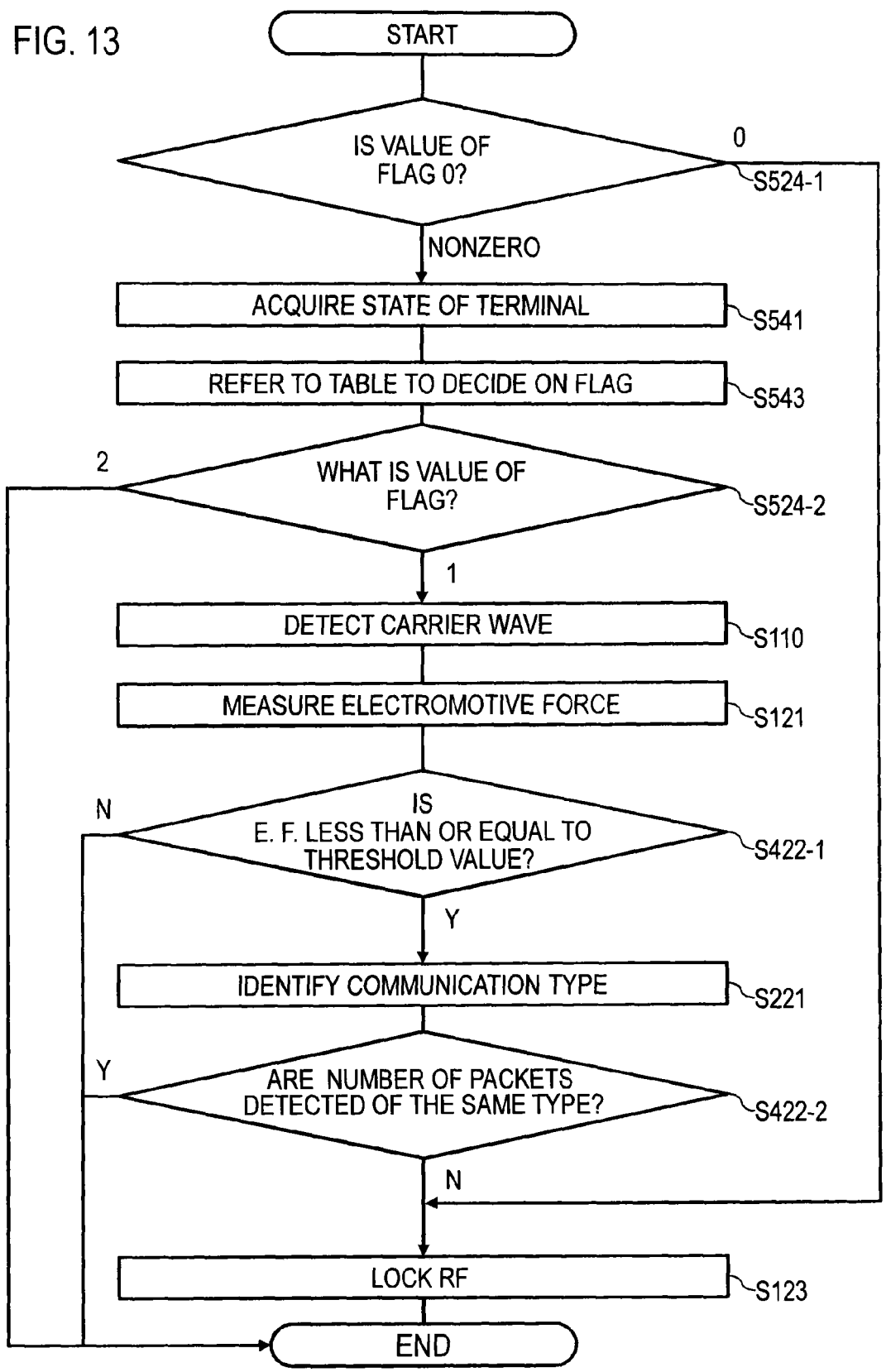
FIG. 13 is a flowchart illustrating an operation of the mobile terminal of the fifth embodiment.

A mobile terminal of a fifth embodiment will be described next in detail with reference to FIGS. 12, 13 and 14, which includes an extended version of the flag setting function of the mobile terminal 400 of the fourth embodiment. FIG. 12 is a block diagram illustrating a configuration of a mobile terminal 500 of the fifth embodiment. FIG. 13 is a flowchart illustrating an operation of the mobile terminal 500 of the fifth embodiment. FIG. 14 is a diagram illustrating exemplary flags 524 corresponding to states of the terminal acquired by a terminal status management part 541 of the mobile terminal 500 of the fifth embodiment. The mobile terminal 500 of the fifth embodiment includes an antenna 110 for near field communication, an RF part 520, an SE part 130, and a host part 540. The RF part 520 includes an electromotive force measuring part 121, a communication type identifying part 221, a communication permission/prohibition determining part 422, an RF controller 123, and a flag 524. The host part 540 includes a terminal status management part 541, a table storage 542, and a flag deciding part 543. The terminal status management part 541 includes display status detecting means 541-1, position detecting means 541-2, time acquiring means 541-3, and AP detecting means 541-4. The components of the mobile terminal 500 other than the flag 524 and the host part 540 have the same functions as the components of the mobile terminal 400 of the fourth embodiment that are labeled with the same reference numerals and therefore the description of those components will be omitted.

The mobile terminal 500 of the fifth embodiment allows a user to set a value of the flag 524 to any of 0, 1 and 2 through an input into a user operation part, not depicted, of the mobile terminal 500. When the user makes a setting to unconditionally permit near field communication through an input into the user operation part, a value of 2 (indicating permission) is stored in the flag 524. When the user makes a setting to conditionally permit near field communication through an input into the user operation part, a value of 1 (indicating conditional permission) is stored in the flag 524. On the other hand, when the user makes a setting to prohibit near field communication through an input into the user operation part, a value of 0 (indicating prohibition) is stored in the flag 524.

The terminal status management part 541 of the fifth embodiment acquires a terminal state which serves as information used for automatically determining the flag 524. As has been described above, the flag 524 can be manually set by the user to any of 2 (permission), 1 (conditional permission) and 0 (prohibition). Depending on a state of the terminal, however, the flag deciding part 543 can estimate a value desired by the user and set the flag to the value without waiting for the user to make a manual setting. For example, the display status detecting means 541-1 of the terminal status management part 541 detects whether the display is locked or unlocked by the user. From this, it can be readily known whether or not the user is using the mobile terminal. When the display of the mobile terminal 500 is unlocked, the user is probably operating or has been operating the mobile terminal 500. In such a situation, the need for prohibition of near field communication is low because the mobile terminal 500 is under the control of the user. On the other hand, when the display of the mobile terminal 500 is locked, it is likely that the user is not operating the mobile terminal 500 and the mobile terminal 500 is left somewhere or the user is carrying the mobile terminal 500 in a pocket or bag. In such a situation, the need for prohibition of near field communication is high because the mobile terminal 500 is not under the control of the user. The position detecting means 541-2 of the terminal status management part 541 detects the current position of the mobile terminal 500. The position may be detected by acquiring latitude and longitude information through GPS or may be identified by a base station ID. For example, Japan may be specified as an NFC permitted area. Alternatively, a narrow area such as the district where the user lives may be specified as an NFC permitted area. This allows discrimination between a place for which the user especially wants to set a high level of security and a place for which the user does not want to set a high level of security on the mobile terminal 500. For example, if the detected position is within an NFC permitted area, the mobile terminal is in a location familiar to the user and the need for prohibition of near field communication is low. On the other hand, if the detected position is outside the NFC permitted area, the mobile terminal is an area unfamiliar to the user and the need for prohibition of near field communication is high. The time acquiring means 541-3 of the terminal status management part 541 acquires the current time. The current time may be acquired using a clock circuit incorporated in a conventional mobile terminal or may be acquired from time correction information broadcast from a base station. For example, the time from 9:00 to 24:00 can be set as NFC permitted hours. From this setting, bedtime hours in which the user is likely to leave the mobile terminal 500 untouched can be identified. For example, near field communication does not need to be prohibited during the NFC permitted hours because the mobile terminal 500 is under the control of the user. On the other hand, hours outside the NFC permitted hours may be bedtime hours and the need for prohibiting near field communication is high during those hours because the user is likely to leave the mobile terminal 500 untouched and the mobile terminal 500 is not under the control of the user. The AP detecting means 541-4 of the terminal status management part 541 detects the service set identifier (SSID) of a wireless LAN access point (AP) near the mobile terminal. As with the NFC permitted area described above, the SSIDs of APs located in an area familiar to the user are whitelisted beforehand and the SSIDs of APs located in an area unfamiliar to the user are blacklisted beforehand so that any of the SSID can be used one item of information used for determining the flag.

As has been described above, these items of information concerning the status of the terminal (display status, the current position, current time, and SSIDs of a wireless LAN) are all used for determining the flag. Note that the configuration of the terminal status management part 541 is not limited to the one described with this embodiment and any of the components 541-1, 541-2, 541-3 and 541-5 may be omitted. A table in which correspondence between the states of the mobile terminal 500 and values of the flag 524 are defined is stored in the table storage 542 beforehand. For example, a table in FIG. 12 defines correspondences as follows. When the display is locked, the flag 524 is set to 2 (permission); when the detected position is outside the NFC permitted area, the flag 524 is set to 1 (conditional permission); when the current time is outside the NFC permitted hours, the flag 524 is set to 1 (conditional permission); when an wireless LAN access point is blacklisted as predetermined, the flag 524 is set to 1 (conditional permission); when a wireless LAN access point is on a predetermined whitelist, the flag 524 is set to 2 (permission); when none of the five conditions are met, the flag 524 is set to 1 (conditional permission). Here, priorities can be assigned to the states of the terminal as shown in FIG. 12 and if more than one of the states of the terminal in the table applies, the item of the highest priority may be chosen to determine the single value for the flag 524. For example, when the display is unlocked and at the same time the detected position is outside the NFC permitted area, the flag 524 can be set to any of values 2 (permission) and 1 (conditional permission). However, the unlocked state of the display is given precedence and the flag 524 is set to 2 since the priority of the item relating to the display status is higher than the priority of the item relating to the detected position in the example in FIG. 12.

The description will be continued with reference to the flowchart of FIG. 13. First, when the value stored in the flag 524 is 0 (prohibition; 0 at S524-1), the communication permission/prohibition determining part 422 outputs a communication prohibition signal and the RF controller 123 acquires the communication prohibition signal and locks the RF part 520 (S123). When the value stored in the flag 524 is not 0 (the value is 1 or 2; NONZERO at S524-1), the terminal status management part 541 acquires a terminal state (S541). Then, the flag deciding part 543 refers to the table stored beforehand in the table storage 542 to decide between 1 and 2 as the value of the flag corresponding to the state of the mobile terminal acquired from the terminal status management part 541 and changes the value of the flag 524 to the decided value (S543). If the new value stored in the flag 524 is 2 (permission; 2 at S524-2), further operations are not performed regardless of the communication source being a mobile terminal or not, the communication permission/prohibition determining part 422 does not output a communication prohibition signal and the RF controller 123 does not lock the RF part 520 (END). On the other hand, if the new value stored in the flag 524 is 1 (conditional permission; 1 at S524-2), steps S110, S121, S422-1, S221, S422-2 and S123 are performed. Operations at steps S110, S121, S422-1, S221, S422-2 and S123 are the same as the operations of the mobile terminal of the fourth embodiment that are labeled with the same numerals.

The operation of the flag deciding part 543 will be further described with respect to three examples illustrated in FIG. 14 (FIGS. 14A, 14B and 14C). When the display is locked, the detected position is in an NFC permitted area, the current time is within NFC permitted hours, and the wireless LAN access point near the mobile terminal is not blacklisted nor whitelisted as in the example in FIG. 14A, for example, none of the items in the table in FIG. 12 apply. In this case, "None is applicable" of the sixth highest priority is selected and the flag is set to the corresponding value=1. When the display is locked, the detected position is in the NFC permitted area, the current time is within the NFC permitted hours, and the wireless LAN access point near the mobile terminal is blacklisted as in the example in FIG. 14B, the mobile terminal is the state corresponding to the fourth highest priority in the table in FIG. 12. In this case, the flag is set to the value=1 corresponding to the fourth highest priority regardless of whether or not the state of the fifth highest priority applies. When the display is locked and the detected position is outside the NFC permitted area as in the example in FIG. 14C, the mobile terminal is in the state of the second highest priority in the table in FIG. 12. In this case, the flag is set to the value=1 corresponding to the second highest priority regardless of whether or not any of the states of the third, fourth and fifth priorities applies.

As has been described above, in the mobile terminal 500 of this embodiment, the flag deciding part 543 decides on an optimum flag 524 on the basis of the state of the mobile terminal 500 acquired by the terminal status management part 541 and on the table stored beforehand in the table storage 542, and the RF controller 123 locks the RF part 520 depending on the level of permission of near field communication (unconditional permission, conditional permission or complete prohibition of near field communication) indicated by the value of the flag 524. Therefore, the mobile terminal 500 is capable of more appropriately determine whether to permit or not information reading in near field communication, in addition to having the effects of the fourth embodiment.

The processes described above may be performed not only in time sequence as is written or may be performed in parallel with one another or individually, depending on the throughput of the apparatuses that perform the processes or requirements. It would be understood that other modifications can be made without departing from the spirit of the present invention.

If any of the configurations described above is implemented by a computer, the processes of the functions the apparatuses need to include are described by a program. The processes of the functions are implemented on the computer by executing the program on the computer.

The program describing the processes can be recorded on a computer-readable recording medium. The computer-readable recording medium may be any recording medium such as a magnetic recording device, an optical disc, a magneto-optical recording medium, and a semiconductor memory, for example.

The program is distributed by selling, transferring, or lending a portable recording medium on which the program is recorded, such as a DVD or a CD-ROM. The program may be stored on a storage device of a server computer and transferred from the server computer to other computers over a network, thereby distributing the program.

A computer that executes the program first stores the program recorded on a portable recording medium or transferred from a server computer into a storage device of the computer. When the computer executes the processes, the computer reads the program stored on the recording medium of the computer and executes the processes according to the read program. In another mode of execution of the program, the computer may read the program directly from a portable recording medium and execute the processes according to the program or may execute the processes according to the program each time the program is transferred from the server computer to the computer. Alternatively, the processes may be executed using a so-called ASP (Application Service Provider) service in which the program is not transferred from a server computer to the computer but process functions are implemented by instructions to execute the program and acquisition of the results of the execution. Note that the program in this mode encompasses information that is provided for processing by an electronic computer and is equivalent to the program (such as data that is not direct commands to a computer but has the nature that defines processing of the computer).

While the apparatuses are configured by causing a computer to execute a predetermined program in the embodiments described above, at least some of the processes may be implemented by hardware.

What is claimed is:

1. A mobile terminal comprising an antenna for near field communication and an RF part,
   wherein the RF part comprises:
   a communication type identifying part identifying, on a received packet-by-packet basis, a communication type of a carrier wave received by the antenna;
   a communication permission/prohibition determining part that, when results of the packet-by-packet communication type identification are not the same for consecutive packets, determines that a sender of the carrier wave is a remote mobile terminal, and outputs a communication prohibition signal; and
   an RF controller acquiring the communication prohibition signal and locking the RF part.

2. The mobile terminal according to claim 1,
   wherein the RF part further comprises a flag, and
   the flag stores a value of 1 when a user of the mobile terminal makes a setting to permit near field communication, and stores a value of 0 when the user of the mobile terminal makes a setting to prohibit near field communication; and
   when the flag is 0, the communication permission/prohibition determining part outputs a communication prohibition signal without making determination as to whether the sender of the carrier wave is the remote mobile terminal or not.

3. A mobile terminal comprising an antenna for near field communication and an RF part,
   wherein the RF part comprises:
   an electromotive force measuring part measuring an electromotive force of a carrier wave received by the antenna;
   a communication type identifying part identifying, on a received packet-by-packet basis, a communication type of a carrier wave received by the antenna;
   a communication permission/prohibition determining part that, when the measured electromotive force is less than or equal to a predetermined threshold value and results of the packet-by-packet communication type identification are not the same for consecutive packets, determines that a sender of the carrier wave is a remote mobile terminal, and outputs a communication prohibition signal; and an RF controller acquiring the communication prohibition signal and locking the RF part.

4. The mobile terminal according to claim 3, wherein the RF part further comprises a flag, and the flag stores a value of 1 when a user of the mobile terminal makes a setting to permit near field communication, and stores a value of 0 when the user of the mobile terminal makes a setting to prohibit near field communication; and when the flag is 0, the communication permission/prohibition determining part outputs a communication prohibition signal without making determination as to whether the sender of the carrier wave is the remote mobile terminal or not.

5. A mobile terminal comprising an antenna for near field communication and an RF part, wherein the RF part comprises:

an electromotive force measuring part measuring an electromotive force of a carrier wave received by the antenna;

a communication permission/prohibition determining part that, when the measured electromotive force is less than or equal to a predetermined threshold value, determines that a sender of the carrier wave is a remote mobile terminal, and outputs a communication prohibition signal;

an RF controller acquiring the communication prohibition signal and locking the RF part;

a flag that stores a value of 1 when a user of the mobile terminal makes a setting to permit near field communication, and stores a value of 0 when the user of the mobile terminal makes a setting to prohibit near field communication;

when the flag is 0, the communication permission/prohibition determining part outputs a communication prohibition signal without making determination as to whether the sender of the carrier wave is the remote mobile terminal or not;

the mobile terminal further comprising a terminal status management part, a table storage and a flag deciding part, wherein the flag stores any one of values 2, 1 and 0 according to a user setting or to a flag decided on by the flag deciding part;

the terminal status management part acquires a state of the mobile terminal;

the table storage stores a table in which correspondence between a state of the mobile terminal and the flag is defined;

the flag deciding part refers to the table to decide between 1 and 2 as the flag corresponding to the acquired state of the mobile terminal when the flag is not 0, and changes the flag to the decided flag; and the communication permission/prohibition determining part does not output a communication prohibition signal when the flag is 2.

6. An information reading preventing method using a mobile terminal comprising an antenna for near field communication and an RF part, the method comprising:

a communication type identifying step of identifying, on a received packet-by-packet basis, a communication type of a carrier wave received by the antenna;

a communication permission/prohibition determining step of, when results of the packet-by-packet communication type identification are not the same for consecutive packets, determining that a sender of the carrier wave is a remote mobile terminal and outputting a communication prohibition signal; and an RF controlling step of acquiring the communication prohibition signal and locking the RF part.

7. The information reading preventing method according to claim 6, further comprising a flagging step of storing a value of 1 when a user of the mobile terminal makes a setting to permit near field communication, and storing a value of 0 when the user of the mobile terminal makes a setting to prohibit near field communication;

wherein, when the flag is 0, the communication permission/prohibition determining step outputs a communication prohibition signal without making determination as to whether the sender of the carrier wave is the remote mobile terminal or not.

8. An information reading preventing method using a mobile terminal comprising an antenna for near field communication and an RF part, the method comprising:

an electromotive force measuring step of measuring an electromotive force of a carrier wave received by the antenna;

a communication type identifying step of identifying, on a received packet-by-packet basis, a communication type of a carrier wave received by the antenna;

a communication permission/prohibition determining step of, when the measured electromotive force is less than or equal to a predetermined threshold value and results of the packet-by-packet communication type identification are not the same for consecutive packets, determining that a sender of the carrier wave is a remote mobile terminal and outputting a communication prohibition signal; and an RF controlling step of acquiring the communication prohibition signal and locking the RF part.

9. The information reading preventing method according to claim 8, further comprising a flagging step of storing a value of 1 when a user of the mobile terminal makes a setting to permit near field communication, and storing a value of 0 when the user of the mobile terminal makes a setting to prohibit near field communication;

wherein, when the flag is 0, the communication permission/prohibition determining step outputs a communication prohibition signal without making determination as to whether the sender of the carrier wave is the remote mobile terminal or not.

10. An information reading preventing method using a mobile terminal comprising an antenna for near field communication and an RF part, the method comprising:

an electromotive force measuring step of measuring an electromotive force of a carrier wave received by the antenna;

a communication permission/prohibition determining step of, when the measured electromotive force is less than or equal to a predetermined threshold value, determining that a sender of the carrier wave is a remote mobile terminal and outputting a communication prohibition signal;

an RF controlling step of acquiring the communication prohibition signal and locking the RF part;

a flagging step of storing a value of 1 when a user of the mobile terminal makes a setting to permit near field communication, and storing a value of 0 when the user of the mobile terminal makes a setting to prohibit near field communication, wherein, when the flag is 0, the communication permission/prohibition determining step outputs a communication prohibition signal without making determination as to whether the sender of the carrier wave is the remote mobile terminal or not;

a terminal status managing step;

a table storing step;

a flag deciding step;

the flagging step stores any one of values 2, 1 and 0 according to a user setting or to a flag decided on by the flag deciding step;

the terminal status managing step acquires an a state of the mobile terminal;

the table storing step stores a table in which correspondence between a state of the mobile terminal and the flag is defined;

the flag deciding step refers to the table to decide between 1 and 2 as the flag corresponding to the acquired state of the mobile terminal when the flagging step stores a value that is not 0 and changing the flag to the decided flag; and the communication permission/prohibition determining step does not output a communication prohibition signal when the flag is 2.

* * * * *